United States Patent [19]

Wilmot

[11] 4,439,765
[45] Mar. 27, 1984

[54] RADAR VIDEO PROCESSOR

[75] Inventor: Richard D. Wilmot, Buena Park, Calif.

[73] Assignee: Hughes Aircraft Company, El Segundo, Calif.

[21] Appl. No.: 208,356

[22] Filed: Nov. 19, 1980

[51] Int. Cl.³ .............................................. G01S 13/86
[52] U.S. Cl. ........................................ 343/6 A; 358/136
[58] Field of Search ............ 343/5 VQ, 6 A; 358/136

[56] References Cited

U.S. PATENT DOCUMENTS

| | | | |
|---|---|---|---|
| 2,897,490 | 7/1959 | Sunstein | 343/6 A X |
| 3,093,823 | 6/1963 | Reed | 343/6 A X |
| 3,201,787 | 8/1965 | Grewe et al. | 343/6 A X |
| 3,325,806 | 6/1967 | Wilmot et al. | 343/5 |
| 3,333,056 | 7/1967 | Pratt | 178/6.8 |
| 3,353,177 | 11/1967 | Wilmot | 343/5 VQ X |
| 3,463,876 | 8/1969 | Law | 178/6 |
| 3,571,505 | 3/1971 | Mounts | 358/136 |
| 3,670,096 | 6/1972 | Candy et al. | 358/136 |
| 3,683,380 | 8/1972 | Cantwell, Jr. et al. | 343/5 VQ X |
| 3,720,942 | 3/1973 | Wilmot et al. | 343/5 VQ X |
| 3,727,218 | 4/1973 | Cantwell, Jr. et al. | 343/5 VQ |
| 3,736,373 | 5/1973 | Pease | 358/136 |
| 3,745,570 | 7/1973 | Voles | 343/6 A X |
| 3,940,762 | 2/1976 | Ethington et al. | 343/5 DP |
| 3,946,382 | 3/1976 | Kossiakoff | 343/5 VQ |
| 4,074,264 | 2/1978 | Wilmot | 343/5 VQ X |
| 4,197,539 | 4/1980 | Suzuki | 343/5 VQ X |
| 4,347,618 | 8/1982 | Kavouras et al. | 343/6 A X |

OTHER PUBLICATIONS

"Economical Radar Information Transmission Utilizing Band Compression Techniques," T. Furuhashi et al., IEEE Int'l Radar Conference Record, Sep. 1975, pp. 164-169.

*Primary Examiner*—T. H. Tubbesing
*Attorney, Agent, or Firm*—Thomas A. Runk; L. V. Link, Jr.; A. W. Karambelas

[57] ABSTRACT

Apparatus for processing radar video signals and applying the processed signals to a radar display. The apparatus includes video extraction circuitry which removes random pulse interference and noise from the video signals. The improvement of the present invention comprises clutter transmission circuitry and a memory which transmits and stores clutter video signals provided by the video extraction circuitry. In addition, comparison circuitry is provided which compares the applied signals (present video) provided by the video extraction circuitry to time-averaged signals computed thereby. The comparison circuitry transmits the present video signals to the radar display when the difference between the present video signals and the time-averaged signals is greater than a predetermined value. In one specific embodiment, the comparison circuitry includes scan-to-scan correlation circuitry which provides time-averaged video signals which are averaged in a predetermined manner over a plurality of azimuth scans. The comparison circuitry also includes a comparator which compares the signals provided by the video extraction circuitry (present video) and the time-averaged signals and transmits the present video signals when the difference between the present video and time-averaged signals is greater than a predetermined value.

5 Claims, 9 Drawing Figures

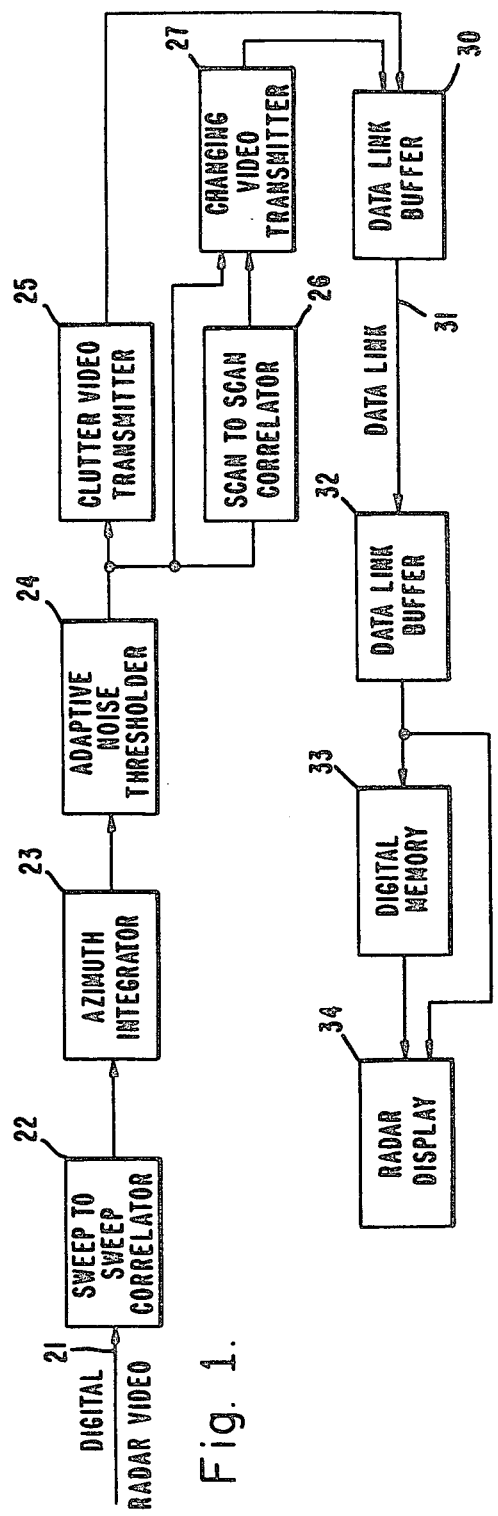
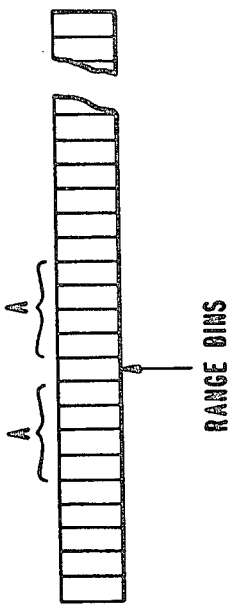
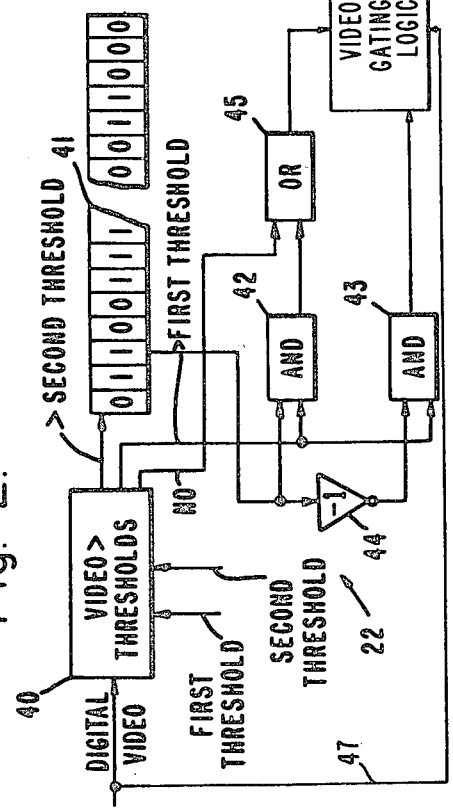

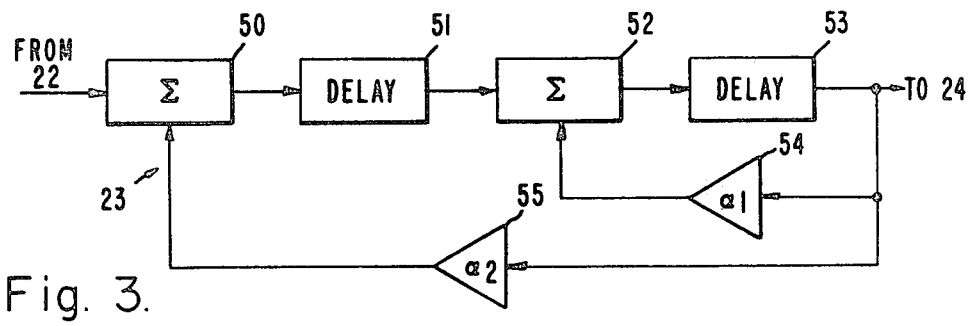
Fig. 3.
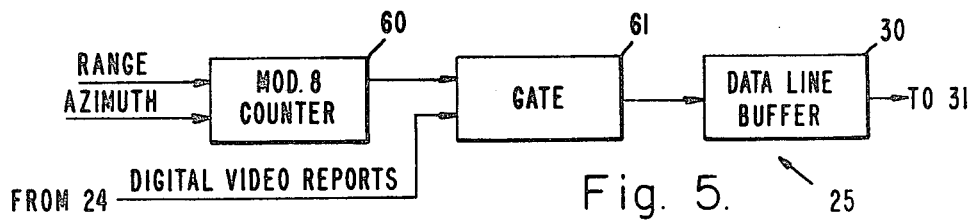
Fig. 5.
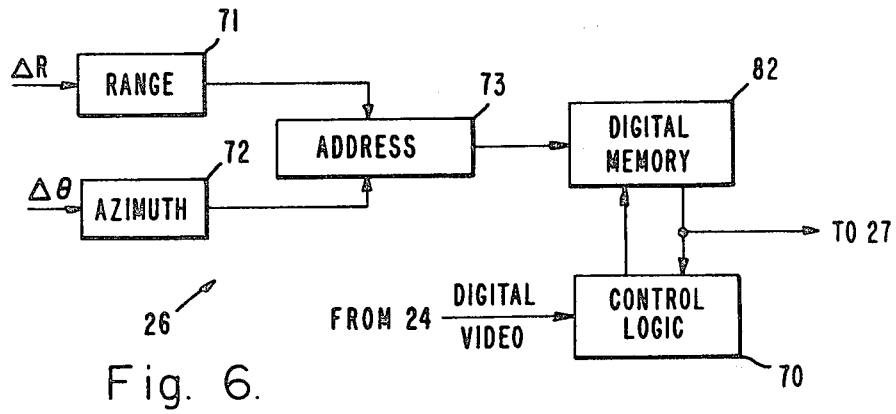
Fig. 6.
Fig. 7.
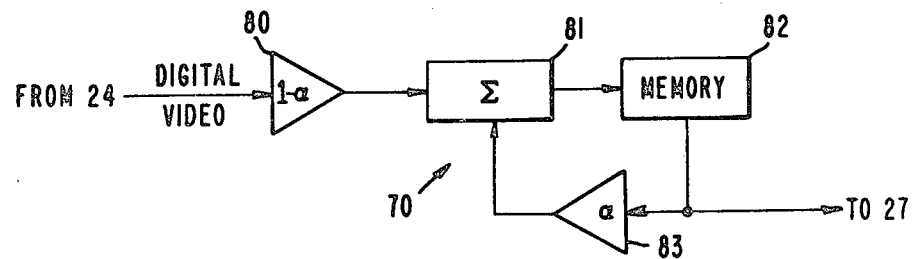

RADAR VIDEO PROCESSOR

BACKGROUND OF THE INVENTION

The present invention relates generally to radar signal processors and more particularly to radar signal processors which are capable of transmitting both clutter and target signals to a remotely located radar display.

Many modern radar systems have signal processing circuitry which is designed to eliminate radar clutter signals provided to a radar display. In many systems only the target information is transmitted to the display. For example, many radar signal processors incorporate a sweep-to-sweep correlator, azimuth integrator, and thresholding circuitry which helps to eliminate random pulse interference and noise. Many systems, however, utilize thresholding circuitry which only transmits target signal data and which suppresses radar clutter signals. This is accomplished by having an adaptive threshold which eliminates the clutter. In certain situations, it may be advantageous to view the clutter which is observed by the radar system. Allowing the operator the opportunity to view the clutter on the radar display may provide assistance in determining the presence of targets. For instance, if a potential target is moving toward a highly cluttered area, the operator may have the opportunity to change thresholding levels in order to see the target more clearly in the cluttered background or to provide manual assistance in tracking the target. Also, in air traffic control applications, it is desirable to know the location of weather clutter so that air traffic may be rerouted to avoid inclement weather. Heretofore, radar systems which allowed display of clutter and moving targets required a wide bandwidth communications link between the signal processor and radar display. This wideband communications link was required in order to continuously transmit the clutter information during each sweep of the radar antenna scan.

Thus, a problem common to most prior art systems relates to attempts to use a narrow band, low cost communications data link between the signal processor and the radar display. For example, use of a medium quality radar transmission line as a communication link was described in "Economical Radar Information Transmission Utilizing Band Compression Techniques", by T. Furuhashi et al, IEEE International Radar Conference Record, September 1975, pages 164–169. This system utilizes a resolution reduction of the radar video in azimuth by a 4:1 ratio and in range by 2:1 to transmit 0.3 megahertz video with targets and clutter over a 40 kilohertz communications line.

Thus, it would be an improvement in the radar art to provide a system which allows for the display of clutter on the radar display when desired by the operator and which allows the use of a low cost, narrow bandwidth communications data link between the signal processor and the radar display.

SUMMARY OF THE INVENTION

The present invention provides for apparatus which processes applied digital radar video signals derived from a radar receiver and applies these signals to a radar display. The apparatus includes digital video extraction circuitry which processes the digital radar video signals to remove random pulse interference and noise therefrom.

The improvement of the present invention comprises clutter transmission circuitry coupled to the video extraction circuitry which transmits the radar clutter digital video signals received by the radar receiver at preselected time periods determined by the radar operator. A memory is coupled to the transmission circuitry and to the radar display for storing the radar clutter signals and for applying the stored signals to the radar display. Comparison circuitry is coupled to the video extraction circuitry and the radar display which compares the digital signals applied thereto (present video) to time-averaged signals computed thereby. The comparison circuitry transmits the present video signals to the radar display when the difference between the present video signals and the time-averaged signals is greater than a predetermined value.

The comparison circuitry comprises scan-to-scan correlation circuitry and comparison circuitry. The scan-to-scan correlation circuitry is coupled to the video extraction circuitry and provides digital video signals which are time-averaged in a predetermined manner over a plurality of scans. The comparison circuitry also includes a comparator coupled to the video extraction circuitry and the correlation circuitry which compares the digital signals provided thereto (present video) and which transmits the present video signals provided by the extraction circuitry to the radar display when the difference between the present video signals and time-averaged signals is greater than a preselected value.

The present invention allows for wideband radar video signals to be transmitted over a narrowband communication system without degrading the video display characteristics. This is accomplished by integration and adaptive thresholding in the video extraction circuitry to remove unwanted noise returns. Sweep-to-sweep correlation is also provided as part of the video extraction circuitry to eliminate random pulse interference. Scan-to-scan correlation is also provided to eliminate stationary or slow-moving clutter after it has been transmitted and stored in the memory for use with the radar display. The present invention reduces the required communications link bandwidth from about 0.3 megahertz to about 3,600 hertz, as compared with the prior art reduction from 0.3 megahertz to 40 kilohertz. The narrow bandwidth requirement provided by the present invention allows for low-quality telephone lines to be used as the communications data link between the signal processor and the radar display.

BRIEF DESCRIPTION OF THE DRAWINGS

The various features and advantages of the present invention may be more readily understood with reference to the following detailed description of the invention taken in conjunction with the accompanying drawings, wherein like reference numerals designate like structural elements, and in which:

FIG. 1 is a block diagram of a signal processing system made in accordance with the present invention;

FIG. 2 is a diagram of a sweep-to-sweep correlator suitable for use in the system of FIG. 1;

FIG. 3 is a diagram of an azimuth integrator suitable for use in the system of FIG. 1;

FIG. 4 is a diagram which assists explanation of the adaptive noise thresholder of FIG. 1;

FIG. 5 is a diagram of an initial clutter video transmitter suitable for use in the system of FIG. 1;

FIG. 6 shows a scan-to-scan correlator coupled to a digital memory which is suitable for use in the system of FIG. 1;

FIG. 7 is a diagram of the control logic which is suitable for use in the scan-to-scan correlator of FIG. 6;

DETAILED DESCRIPTION OF THE INVENTION

Figure 8:
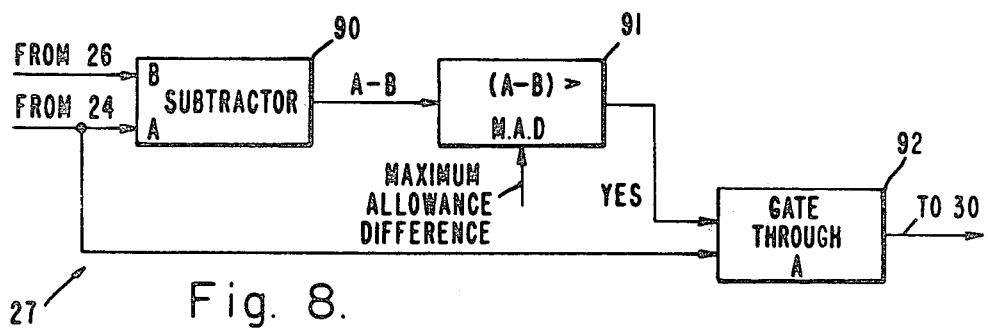
FIG. 8 is a diagram of a changing video transmitter suitable for use in the system of FIG. 1.

Referring to FIG. 1, there is shown a signal processing system for use with a radar receiver which processes radar video signals and applies the processed signals to a radar display. The system includes a sweep-to-sweep correlator 22 which is coupled to a radar antenna and pre-processing circuitry (not shown), and which accepts digital radar video signals 21 from the pre-processing circuitry. The sweep-to-sweep correlator 22 is designed to eliminate high amplitude random pulse interference from the radar video signal 21. An azimuth integrator 23 is coupled to the sweep-to-sweep correlator 22 which is designed to integrate a predetermined number of sweeps at each range interval in order to enhance the signal-to-noise ratio. The azimuth integrator 23 is generally well-known in the art, and one example thereof may be found in U.S. Pat. No. 3,727,218, issued to Cantwell, Jr. et al, with particular reference to FIG. 3 of the patent. The azimuth integrator 23 is coupled to an adaptive noise thresholder 24 which is utilized to eliminate unwanted noise returns. The adaptive noise thresholder 24 is also well-known in the art and an example thereof is given in U.S. Pat. No. 3,720,942 issued to Wilmot et al, with particular reference to FIG. 3 thereof. The sweep-to-sweep correlator 22, azimuth integrator 23 and adaptive noise thresholder 24 generally form what is known as a video extractor, which is generally described in U.S. Pat. No. 3,720,942 identified above.

The adaptive noise thresholder 24 is coupled to a plurality of system components including a radar video clutter transmitter 25, a scan-to-scan correlator 26 and a changing video transmitter 27. The radar video clutter transmitter 25 processes the background clutter at pre-selected times (generally at the time of system start-up) determined by the system operator, and transmits the clutter through a first data link buffer 30, through a data link 31 to a second data link buffer 32 and hence to a digital memory 33. The digital memory stores the clutter video signals. The scan-to-scan correlator 26 provides the function of a recursive filter, sampling in the time domain, which may incorporate one or more poles. The scan-to-scan correlator 26 averages the video signals from scan to scan to improve the signal-to-noise ratio.

The scan-to-scan correlator 26 and adaptive noise thresholder 24 are coupled to the changing video transmitter 27. The scan-to-scan correlator 26 and changing video transmitter 27 comprise comparison circuitry which transmits the present video when it is substantially different from the time-averaged video. The changing video transmitter 27 is in essence a subtraction circuit which subtracts the smooth video signals provided by the scan-to-scan correlator 26 from the present video signals provided by the adaptive noise thresholder 24. The changing video transmitter 27 transmits only those present video signals which differ from the signals provided by the scan-to-scan correlator 26 by a predetermined amount. Hence, the changing video transmitter 27 transmits only moving targets or video signals which change in amplitude from scan to scan through the data link 31. The changing video transmitter is coupled to the first data link buffer 30 and hence through the data link 31 to the second data link buffer 32. The second data link buffer 32 is then coupled to a radar display 34, such as a PPI display, or the like, which allows the output signals from the changing video transmitter 27 to be applied to the radar display 34. The first buffer 30 is used to provide temporary storage of the data, to format the data, and change the data transmission rate from a real time, high speed radar data rate to a low speed, data link data transmission rate. The second buffer 32 provides a similar set of functions to interface the data link 31 with the digital memory 33 and radar display 34. The digital memory 33 is also coupled to the radar display 34 which allows the radar clutter signals stored therein to be applied to the radar display 34 at the option of the radar system operator. It is to be understood that the radar display 34 is normally located at a point remote from the antenna and signal processor, typically from 10–200 miles, which necessitates the use of the data link 31.

Hence, the system of FIG. 1 provides for radar signal processing which initially transmits the radar clutter signals received by the radar antenna to a digital memory 33 which stores the radar clutter for optional use by the radar system operator. The remainder of the signals transmitted through the system comprise only changing video signals which normally amount to moving targets, or the like, which are directly applied to the radar display 34. When the radar operator feels the necessity to view the radar clutter, he need only control the output from the digital memory 33 to apply those signals to the radar display 34. The ability to supply clutter signals to the radar display 34 gives the radar operator an added dimension of control over the radar system. In addition, the operator may adjust system parameters for targets moving through highly cluttered background areas, since he has the ability to know precisely where the radar clutter is on his radar display.

A more detailed description of the various components of the system of FIG. 1 will be hereinafter described with reference to FIGS. 2 through 9. FIGS. 2 through 9 describe in more detail the design and operation of the various components of FIG. 1.

Referring now to FIG. 2 there is shown an embodiment of the sweep-to-sweep correlator 22 suitable for use with the system of FIG. 1. The sweep-to-sweep correlator 22 includes a comparison circuit 40 which is designed to compare the applied digital signals 21 to two predetermined threshold levels. If the video amplitude is greater than the second threshold (intermediate level) then the output of the comparator 40 is applied to a shift register 41, which may be a CCD arrangement, or the like, which comprises a predetermined number of registers equal to the range bins associated with the radar system, with each register having one bit associated therewith. The true output of the comparator 40 for the first threshold (high level) is connected to first inputs of two AND gates 42, 43. The output of the shift register 41 is connected to the second input of the first AND gate 42 and through an inverter 44 to the second input of AND gate 43. The false output of the comparator 40, which indicates that the video signal is less than or equal to the first threshold level, is coupled to one input of an OR gate 45, and the output of AND gate 42 is connected to the second input of OR gate 45, OR gate 45 is coupled to video gating logic 46 and when OR gate 45 is true, video gating logic 46 gates the digital video 47 to azimuth integrator 23. The output of AND gate 43 is coupled to video gating logic 46, and when AND gate 43 is false, video gating 46 will gate zero amplitude to azimuth integrator 23. Thus a strong signal will be accepted only if it was also of at least moderate strength on the previous transmission so that strong random pulses are rejected.

Referring now to FIG. 3 there is shown an embodiment of the azimuth integrator 23 suitable for use with the system of FIG. 1. The azimuth integrator 23 includes a first summer 50 which receives signals from the sweep-to-sweep correlator 22, and which is coupled to a first delay circuit 51 which provides storage for one pulse repetition period (1 sweep) of data. The output of the first delay circuit 51 is connected to a second summer 52 and a second delay circuit 53 with the same amount of delay as the first delay circuit 51. The output of the second delay circuit 53 is connected through a first multiplier 54 which is coupled back to the second summer 52, and is coupled through a second multiplier 55 which is coupled to the first summer 50. The output of the azimuth integrator 23 is taken from a point between the second delay circuit 53 and the multipliers 54, 55 and is coupled to the adaptive noise thresholder 24. The design of the circuit of FIG. 3 is substantially that shown in FIG. 3 of U.S. Pat. No. 3,727,218. This circuit comprises a two pole recursive smoother with elements 50, 51 and 55 providing one pole while elements 52, 53 and 54 provide for the second pole. The azimuth integrator 23 integrates a predetermined number of sweeps at the same range interval which enhances the signal-to-noise ratio. The azimuth integrator 23 is designed to integrate the signal return received from targets within one beamwidth.

The adaptive noise thresholder 24 is well-known in the art and a representative thresholder may be found in FIG. 3 of U.S. Pat. No. 3,720,942. The adaptive noise thresholder 24 is designed to eliminate unwanted noise returns. For example, and referring to FIG. 4, there is data storage elements representative of the total number of range bins used for estimating the background noise level. With reference to any particular range bin noted by the arrow in FIG. 4, a computation of the mean, or average value, of the set of range bins identified by the brackets marked "A", may be made. Enough samples should be used to obtain an accurate estimate of the background noise. This mean value is utilized as the noise threshold provided by the adaptive noise thresholder 24. Therefore, if the digital video signal applied the adaptive noise thresholder 24 is larger than the mean calculated as above, a detection occurs. Otherwise no detection signals are provided beyond the adaptive noise thresholder 24.

Thus, the adaptive noise thresholder 24 provides an output which is either a target or clutter video signal which has signal levels above the noise threshold, or no signal is transmitted, for those signals below the noise threshold. In a typical digital system the output of the adaptive noise thresholder 24 is in terms of digital words and the signals which are above the noise threshold are identified with a particular flag bit.

Referring now to FIG. 5 there is shown an embodiment of an initial clutter video transmitter 25, which may be employed in the system of FIG. 1, and which includes a MOD 8 counter 60 which is coupled to a gate 61. The signals which are above the noise threshold of the adaptive noise thresholder 24 which are known as digital video reports are provided to a second input of the gate 61. The output of the gate 61 is coupled to the first data link buffer 30 and hence through the data link 31 and second data link buffer 32 to the digital memory 33. Inputs are provided to the MOD 8 counter 60 which identify the range interval and azimuth angle viewed by the radar system. The MOD 8 counter 60 steps through each range interval at each azimuth in a particular segment of the entire 360° azimuth scan of the radar antenna. In this particular instance the MOD 8 counter 60 counts those range and azimuth intervals within a 45° sector of the azimuth interval. Accordingly, the gate 61 upon command from the MOD 8 counter 60 gates through the digital video reports from the adaptive noise thresholder 24 to the digital memory 33 for each of the eight segments of the azimuth sweep of the radar antenna. The transmitted signals are hence stored in the digital memory 33 for subsequent use by the radar display 34.

Referring now to FIG. 6 there is shown an embodiment of the scan-to-scan correlator 26 for use with the present invention which is coupled to a digital memory 82. The scan-to-scan correlator 26 includes range and azimuth buffers 71, 72 which provide range and azimuth information through an address register 73 to the digital memory 82. The range and azimuth buffers sequentially step through each range and azimuth setting for each radar resolution element. Control logic 70 is provided which averages the digital signals from scan to scan to improve the signal-to-noise ratio. The control logic 70, which is shown in more detail in FIG. 7, incorporates a recursive smoother, which includes a multiplier 80 coupled to a summer 81 and hence to the memory 82. The output of the memory 82 is coupled through a second multiplier 83 to the second input of the summer 81. The signal output to the changing video transmitter 27 is taken from a point between the memory 82 and the second multiplier 83. The control logic 70 is, in essence, a one pole recursive filter and operates in a manner similar to the recursive filters described hereinabove, but samples from scan to scan instead of from pulse to pulse as does azimuth integrator 23.

Referring to FIG. 8, there is shown an embodiment of the changing video transmitter 27, which may be employed in the apparatus of FIG. 1, and which includes a subtractor 90 whose output is coupled to a comparator 91. Inputs to the subtractor 90 are provided from the scan-to-scan correlator 26 and the adaptive noise thresholder 24, identified as inputs B and A respectively. The subtractor provides an output equal to $A-B$ and the comparator 91 compares this signal level to a maximum allowable difference threshold (M.A.D.). If the threshold is exceeded, a true output is provided from the comparator 91, and this output is applied to a gating circuit 91 which gates the video through the first data link buffer 30 and hence to the radar display 34. If the M.A.D. threshold is not exceeded, the video amplitude has not changed significantly since the previous scan. Hence, it is deemed to be clutter and is not transmitted over the data link 31, since the clutter returns have previously been transmitted. Thus the changing video transmitter 27 allows only moving returns, and not stationary clutter, to be transmitted therethrough. The moving signals are applied directly to the radar display 34. Because only moving video returns or returns with different amplitudes from scan to scan are transmitted, most of the radar video is not transmitted (noise, random pulses, and stationary clutter). Therefore, a very large reduction in the effective bandwidth necessary to transmit data is obtained. This allows a low cost, narrow bandwidth link to be utilized.

Figure 9:
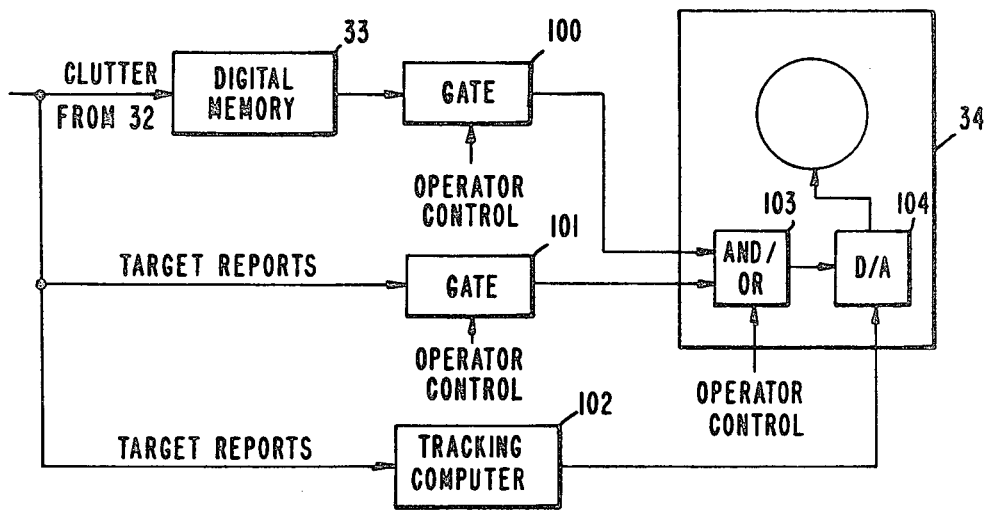
FIG. 9 shows the various components which may be utilized to generate an image on the radar display in accordance with the present invention.

Referring to FIG. 9 there is shown a digital memory 33, a tracking computer 102 and the radar display 34. Initial clutter video signals transmitted through the data link 31 are transmitted to the digital memory 33 and stored therein. The digital memory is then accessed through a gate 100 at preselected times determined by the operator and applied to the radar display 34. The target video reports transmitted through the data link 31 from the changing video transmitter 27 are applied through a gate 101, which may be controlled by the operator, to the radar display 34. In addition, the target video reports may be applied through the tracking computer 102, normally known as a track-while-scan computer, which computes speed, heading, and predicted position for the identified target and applies track symbols directly to the radar display 34. As is shown within the radar display 34, gating circuitry 103 and digital-to-analog conversion means 104 are provided to convert the digital signals provided by the present system to the radar display CRT. Thus, the present invention further exploits the property that most radar clutter changes very little in amplitude or position from scan to scan, so that it is necessary to transmit the radar clutter when the system is initialized or at preselected time intervals determined by the radar operator, and from that time on, transmit only the changes that occur from scan to scan in the radar video. Because receiver noise and random pulse interference are random from scan to scan, but do not provide useful information, they are eliminated by azimuth integration and pulse-to-pulse correlation before the scan-to-scan correlation which is used to identify video returns which have changed significantly in amplitude or position from the previous scan.

In operation the digitized radar video signals 21 are processed by the sweep-to-sweep correlator 22 which stores a quantized video for each range bin of the previous sweep and compares each quantized video amplitude of the present sweep with the video amplitude of the corresponding range bin of the previous sweep. If the amplitude of the video for the present sweep is significantly bigger than that of the previous sweep, based on the amplitude changes that may occur due to beam pattern differences, target and clutter fluctuations, and noise effects, or the like, then the video return in that range bin is rejected as being due to random pulse interference.

The video signal is then processed by the azimuth integrator 23 which provides video integration of the quantized video for each range bin across the azimuth interval equal to the number of sweeps in a radar antenna beamwidth. Then the output of the azimuth integrator 23 is thresholded by the adaptive noise thresholder 24 based on the measured receiver noise level with the threshold selected to provide a negligible probability (approximately $10^{-6}$) of being exceeded by the receiver noise level.

The threshold digital video is then stored in the digital memory 82 which provides a storage element for each range azimuth segment of the entire surveillance area of the radar system. The scan-to-scan correlator 26 is utilized to process the threshold digital video by means of a recursive smoother. The resolution of a scan-to-scan correlator 26 is established by the resolution requirements of the radar display 34 and is typically on the order of one or more beamwidths in azimuth and one or more pulsewidths in range.

To provide an accurate estimate of the video amplitude the scan-to-scan correlator employs a recursive smoother which is described by the following equation:

smoothed amplitude = $(1-\alpha)$(present amplitude) + $(\alpha)$(stored amplitude)

The smoothed amplitude value (V) of the amplitude (A) after N scans is given by $$V_N = \sum_{i=1}^{N}(1-\alpha)Ai(\alpha)^{(i-1)} = \frac{1-\alpha^N}{1-\alpha}\sum_{i=1}^{N}(1-\alpha)Ai$$

The asymptotic value for a constant input is given by $$V_\infty = \sum_{i=1}^{\infty}(1-\alpha)A(\alpha)^{(i-1)} = A(1-\alpha)/(1-\alpha) = A.$$

This particular recursive smoother has no bias. This smoother results in an effective integration period of NE scans where NE = $(1+\alpha)/(1-\alpha)$ so that the standard deviation of the estimate of the video amplitude is reduced by $[(1+\alpha)/(1-\alpha)]^{\frac{1}{2}}$.

The smoothed amplitude is compared each scan with the present video amplitude for each range-azimuth segment and only those amplitudes which are significantly different from those the stored amplitudes are transmitted over the data link 31. This allows moving targets, moving clutter and large amplitude changes for stationary clutter, to be transmitted, but the redundant information for non-moving or non-fluctuating clutter is only transmitted either initially, at the time when the system is turned on, or at the command of the system operator. After the initial clutter transmission, only video which changes in position or amplitude from scan-to-scan is transmitted. Elimination of noise, random pulses, and stationary clutter from the data link load allows a very small bandwidth to be used for the meaningful video data.

For example, a digital video report with ten bits of range information, ten bits of azimuth information, seven bits of azimuth extent, three bits of amplitude and ten bits of synchronization and parity contains 40 bits of information. Thus, a 1,200 bit per second data link provides the capacity for 30 video reports per second, which amounts to 300 reports for a typical ten second radar antenna scan. Using three parallel 1,200 bit per second data links provides a capacity of 900 video reports per scan which is more than adequate for most applications to provide data on all significant video changes. Thus the technique of the present invention can provide an effective video bandwidth reduction from 0.3 megahertz to about 3,600 hertz.

Thus, there has been described signal processing apparatus which allows for radar clutter to be transmitted and displayed on a radar display while reducing the communications data link bandwidth requirement for transmitting moving target signals to the radar display. The system provides for improved target detection performance without sacrificing range or azimuth resolution.

It is to be understood that the above-described embodiment is mainly illustrative of one of the many specific embodiments of the present invention. Clearly, numerous and varied other arrangements of the present invention may be devised by those skilled in the art without departing from the spirit and scope of the present invention.

What is claimed is:

1. Apparatus for processing applied radar video signals derived from a radar receive to permit the use of a narrow frequency bandwidth data link to a radar display, said apparatus comprising:
   video extraction means coupled to said radar receiver for removing random pulse interference and noise from the video signals;
   first means coupled to said extraction means for transmitting radar clutter video signals, from preselected azimuth segments at selected time periods;
   memory means coupled to said first means and to said radar display for storing said radar clutter video signals applied thereto and applying said stored signals to said radar display; and
   second means coupled to said video extraction means and said radar display for comparing said radar video signals applied thereto to time-averaged, scan-to-scan radar video signals computed thereby, and for transmitting said radar video signals to said radar display when the difference between the radar video signals and said time-averaged radar video signals is greater than a preselected value.

2. The apparatus of claim 1 wherein said second means comprises:
   scan-to-scan correlation means coupled to said video extraction means for providing video signals which are time-averaged in a predetermined manner over a plurality of scans; and
   comparator means coupled to said video extraction means and said correlation means for comparing the video signals provided thereto and for transmitting the video signals to said radar display when the difference between the video signals and the time-averaged signals is greater than a preselected value.

3. The apparatus of claim 2 wherein the scan-to-scan correlation means comprises a recursive digital filter.

4. The apparatus of claim 1 wherein said video extraction means comprises:
   sweep-to-sweep correlation means for removing random pulse interference;
   azimuth integration means for integrating a plurality of azimuth sweeps at each range interval to improve the signal to noise ratio; and
   adaptive noise thresholder means for removing enviromental noise.

5. A radar video signal processor for processing video signals applied from a radar receiver, to permit the use of a narrow frequency bandwidth data link to a radar display, said processor comprising:
   a radar video extractor coupled to said radar receiver for removing random pulse interference and noise from the video signals;
   a clutter video transmitter coupled to said radar video extractor for transmitting radar clutter video signals from preselected azimuth segments;
   a memory coupled to said clutter video transmitter and to said radar display for storing said radar clutter video signals applied thereto and applying said stored signals to said radar display;
   a scan-to-scan correlator coupled to said radar video extractor for providing radar video signals which are time-averaged over a plurality of radar scans; and
   a comparator coupled to said radar video extractor and to said scan-to-scan correlator and to said radar display for comparing radar video signals applied thereto by said radar video extractor and by said scan-to-scan correlator, and for transmitting said video signals of said radar video extractor to said radar display when the difference between said video signals and said time-averaged video signals is greater than a preselected value.

* * * * *